United States Patent
Mayer et al.

(10) Patent No.: US 10,592,756 B2
(45) Date of Patent: *Mar. 17, 2020

(54) METHOD FOR DETECTING A PARKING AREA ON A ROAD SECTION

(71) Applicant: Robert Bosch GmbH, Stuttgart (DE)

(72) Inventors: Philipp Mayer, Stuttgart (DE); Carlos Eduardo Cunha, Palo Alto, CA (US); Thorben Schick, Hardegsen (DE); Peter Christian Abeling, Hannover (DE)

(73) Assignee: Robert Bosch GmbH, Stuttgart (DE)

( * ) Notice: Subject to any disclaimer, the term of this patent is extended or adjusted under 35 U.S.C. 154(b) by 72 days.

This patent is subject to a terminal disclaimer.

(21) Appl. No.: 15/756,285

(22) PCT Filed: Jul. 26, 2016

(86) PCT No.: PCT/EP2016/067730
§ 371 (c)(1),
(2) Date: Feb. 28, 2018

(87) PCT Pub. No.: WO2017/041954
PCT Pub. Date: Mar. 16, 2017

(65) Prior Publication Data
US 2018/0260637 A1    Sep. 13, 2018

Related U.S. Application Data

(63) Continuation-in-part of application No. 14/852,089, filed on Sep. 11, 2015, now Pat. No. 9,542,845.

(30) Foreign Application Priority Data

Nov. 19, 2015  (DE) .......................... 10 2015 222 800

(51) Int. Cl.
*G06K 9/00*  (2006.01)
*G08G 1/14*  (2006.01)
(Continued)

(52) U.S. Cl.
CPC .......... *G06K 9/00812* (2013.01); *G01S 13/08* (2013.01); *G01S 13/931* (2013.01);
(Continued)

(58) Field of Classification Search
CPC ...... G08G 1/14; G08G 1/147; G06K 9/00812; G01S 13/08; G01S 2013/9314
See application file for complete search history.

(56) References Cited

U.S. PATENT DOCUMENTS 7,739,046 B2    6/2010  Satonaka et al.
2014/0085112 A1  3/2014  Gruteser et al.

FOREIGN PATENT DOCUMENTS

DE    10 2004 052 347 A1    5/2006
DE    10 2004 062 021 A1    7/2006
(Continued)

OTHER PUBLICATIONS

International Search Report corresponding to PCT Application No. PCT/EP2016/067730, dated Oct. 26, 2016 (German and English language document) (5 pages).

*Primary Examiner* — Michael J Zanelli
(74) *Attorney, Agent, or Firm* — Maginot, Moore & Beck LLP

(57) ABSTRACT

A method for detecting a parking area on at least one road section includes providing a usable width of the road section. The usable width represents a passable width of the road section between parking vehicles. The method further includes travelling on the road section using a detector vehicle and detecting lateral distances from objects with a detector device arranged in the detector vehicle. The method also includes comparing the detected lateral distances with the usable width, and detecting the parking area based on the comparison.

12 Claims, 5 Drawing Sheets

(51) Int. Cl.
*G01S 13/93* (2020.01)
*G01S 15/08* (2006.01)
*G01S 13/08* (2006.01)
*G08G 1/01* (2006.01)
*G01S 15/93* (2020.01)
*G01S 13/931* (2020.01)
*G01S 15/931* (2020.01)

(52) U.S. Cl.
CPC ............ *G01S 15/08* (2013.01); *G08G 1/0112* (2013.01); *G08G 1/0129* (2013.01); *G08G 1/0133* (2013.01); *G08G 1/0141* (2013.01); *G08G 1/143* (2013.01); *G08G 1/147* (2013.01); *G01S 2013/9314* (2013.01); *G01S 2015/934* (2013.01); *G01S 2015/935* (2013.01)

(56) References Cited

FOREIGN PATENT DOCUMENTS

| | | |
|---|---|---|
| DE | 10 2005 045 260 A1 | 3/2007 |
| DE | 10 2008 028 550 A1 | 12/2009 |
| DE | 10 2009 028 024 A1 | 2/2011 |
| DE | 10 2009 029 553 A1 | 3/2011 |
| DE | 10 2014 212 866 A1 | 1/2016 |
| EP | 2 234 085 A1 | 9/2010 |
| JP | 4705259 B2 | 6/2011 |
| JP | 4741394 B2 | 8/2011 |
| KR | 10-1521842 B1 | 5/2015 |

METHOD FOR DETECTING A PARKING AREA ON A ROAD SECTION

This application is a 35 U.S.C. § 371 National Stage Application of PCT/EP2016/067730, filed on Jul. 26, 2016, which claims the benefit of priority to Ser. No. 14/852,089, filed on Sep. 11, 2015 in the United States and DE 10 2015 222 800.2, filed on Nov. 19, 2015 in Germany, the disclosures of which are incorporated herein by reference in their entirety.

The disclosure relates to a method for detecting a parking area on at least one road section. The disclosure furthermore relates to a device for detecting a parking area on at least one road section.

BACKGROUND

In the related art, various methods are known for determining distances of a vehicle from objects with the aid of distance-based sensors (for example, ultrasonic, radar, laser, video, lidar sensors).

Transmitting parking space data to a server is, for example, known from DE 10 2004 062 021 A1, DE 10 2009 028 024 A1, and DE 10 2008 028 550 A1.

SUMMARY

One object of the disclosure is to provide an improved method for detecting a parking area on a road section.

According to a first aspect, the object is achieved via a method for detecting a parking area on at least one road section, including the steps of:
providing a usable width of the road section, wherein the usable width represents a drivable width of the road section between parked vehicles;
traveling the road section by means of a detection vehicle and determining lateral distances from objects by means of a determination device which is arranged in the detection vehicle (10);
comparing the determined lateral distances to the usable width; and
detecting the parking area by means of the comparison.

The method may advantageously be used in particular for completing incomplete parking space maps. If the measured usable width matches the known, i.e., expected, usable width, it is inferred that the parking area is occupied. As a result, parked vehicles may be used to identify parking areas, whereby known methods which are based exclusively on detecting parking spaces are considerably improved.

Advantageously, as a result, due to the knowledge of the usable width of the road section, parking areas may be detected and, for example, may be provided in the form of a parking space map. In this way, rapid learning of parking areas is made possible, whereby a complete and up-to-date parking space map may be created with the aid of a relatively small number of journeys.

According to a second aspect, the object is achieved via a device for detecting a parking area on a road section, including a detection vehicle having a determination device, wherein lateral distances are able to be determined by means of the determination device, wherein a usable width of the road section is known to the device, and wherein a parking area is able to be detected from a comparison of the determined lateral distances to the usable width.

Preferred embodiments of the method are the subject matter of dependent claims.

One advantageous refinement of the method is characterized in that, in the case that the determined lateral distances deviate from the usable width in a defined manner, an apparent parking area which is detected due to a vehicle which is parked in a second row of the road section is discarded. As a result, detected "false" parking areas may be filtered out, and are not included in the parking space map.

One additional advantageous refinement of the method provides that in the case that the determined lateral distances deviate from the usable width in a defined manner, an apparent parking area which is detected due to a vehicle in oncoming traffic is discarded. Thus, even in the presence of oncoming traffic, a "false" parking area which is detected due to the detection mechanism may be filtered out, and is therefore not included in the parking space map. As a result, a type of "deplausibilization of parking space" is thereby provided, which is advantageously also functional if the usable width is not represented between vehicles parked on the roadsides.

One additional advantageous refinement of the method provides that a maximum usable width of the road section has the following value: 2×maximum range of the determination device+width of the detection vehicle. As a result, ranges of various sensor technologies may be taken into account, for example, ultrasound, radar, laser, etc. If the sensor technology which is used does not achieve the specified range, additional localization methods may be employed, for example, by means of GPS data.

One additional advantageous refinement of the method provides that in the case that a range of the determination device does not cover the entire usable width, a position of the vehicle is detected, wherein the detected position is compared to the determined lateral distances. In this way, for the proper functioning of the method, the the usable width of the road section may also exceed the sensor range.

One additional advantageous refinement of the method provides that objects, in particular vehicles, are detected from the determined distance values. Objects, in particular vehicles, are thereby detected from the determined distances, said vehicles being detected from defined echoes of the determination device. Other objects may also be detected, for example, advertising columns, trash containers, etc., which are not incorporated into the parking space map. As a result, creation of a parking area map may thereby be carried out quickly and efficiently.

One additional advantageous refinement of the method provides that the method is carried out at least partially locally in the detection vehicle and/or at least partially on a server device. In this way, existing computer capacity may be distributed or utilized in the best possible manner.

One advantageous refinement of the method provides that the determined distance data are transmitted to the server device in an automated manner. In this way, in the long term, a large quantity of historical data may be aggregated on the server device, which represent the conditions with a high level of up-to-dateness and accuracy.

One additional advantageous refinement of the method provides that the method is carried out in real time during the journey along the road section or subsequently to the journey, in an evaluation phase. As a result, various evaluation strategies may advantageously be implemented.

One additional advantageous refinement of the method provides that the journeys along the road section are carried out in different driving directions, wherein the determination data of the journeys in the different driving directions are correlated. In this way, the detection of the parking area may advantageously be carried out even more accurately due to the oppositely directed journeys along the road section.

One additional advantageous refinement of the method is characterized in that parking areas are detected for a defined length of the road section. In this way, parking space maps may be created for selectively chosen areas.

The disclosure will be described in detail below having additional features and advantages, based on multiple figures. All disclosed features form the subject matter of the disclosure, independently of their back-reference in the patent claims and independently of their depiction in the description and in the figures. The figures are in particular intended to illustrate the principles relevant to the disclosure.

DETAILED DESCRIPTION

In the context of the disclosure, a so-called "usable width" or "drivable driving width" or "drivable driving lane" or "actual road width" of a road or a section thereof defines a physical width of the road from curb to curb, minus a width of a parked vehicle on each side of the road. It is thus assumed that the usable width is defined only in those areas of the road which is delimited by parking areas. For this purpose, the usable width is determined via prefiltering, whereby, for example, building walls are not taken into consideration as delimiting elements of the road section, for determining the usable width.

For determining the known usable width for the disclosure, specific reflection patterns of alternating vehicles and parking spaces are generally used. In this case, the detection of the aforementioned parking spaces is linked to identification of characteristic echo images, wherein, for example, a sequence of parked vehicle-parking space or parking space-parked vehicle must be present in order to identify the parking space. This requires an extensive number of journeys along the road section, it being very difficult to detect or verify areas which are subject to a high level of parking pressure and which are therefore seldom or never free.

Figure 1:
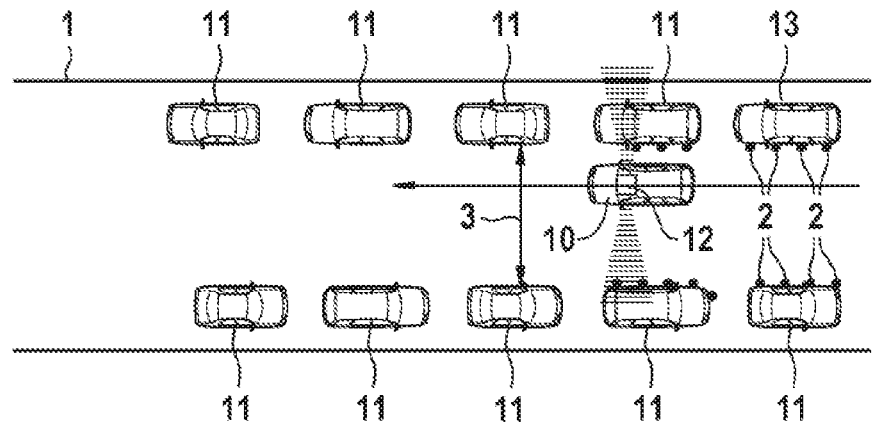
FIG. 1 shows a schematic diagram for describing a functional principle of the method according to the disclosure.

FIG. 1 shows a basic functional principle of the provided method for detecting a parking area on a road section. A detection vehicle 10 is shown which travels on a road section 1 in the direction of the arrow. Parked vehicles 11 are shown on both sides of the road section 1, occupying parking spaces 13 (covered by the vehicles 11) of the road section 1. The detection vehicle 10 includes a determination device 12 for determining a distance from objects which are arranged laterally in the direction of travel, wherein the determination device 12 comprises an ultrasonic sensor, a radar sensor, or another suitable sensor.

As already mentioned, a usable width 3 of the road section 1 is already known in advance by the determination device 12, wherein a manner of determination of the usable width 3 and a manner of provision of the usable width 3 for the determination device 12 are ultimately of secondary importance. Furthermore, it is known to the determination device 12 that the road section 1 has parking areas 13 at least on one side.

When driving the road section 1, it is provided to detect distances from objects, preferably vehicles 11, which are arranged laterally with respect to the detection vehicle 10, and to compare said distances to the known usable width 3. In this way, as many lateral distances as possible are detected between the detection vehicle 10 and the parked vehicles 11, wherein at least one measurement is carried out laterally, essentially at a right angle to the left and to the right of the detection vehicle 10. A result of the aforementioned determinations exists in the form of delimitation points 2 of the usable width 3, which thus represent "sampling points" of the usable width 3. Due to tolerance thresholds, the usable width 3 is represented by an arithmetic average value of distances between the delimitation points 2.

For the case, as shown in FIG. 1, that the measured distance essentially matches the previously known usable width 3 within the range of a defined tolerance threshold (due to measurement and parking inaccuracies), it is inferred that the parking areas 13 along the road section 1 are occupied. In this way, a complete parking space map may be created within a short time, since parking areas 13 (parking spaces) which are definitely unoccupied are not required for the detection of the parking areas 13, as is generally the case in the related art.

Figure 2:
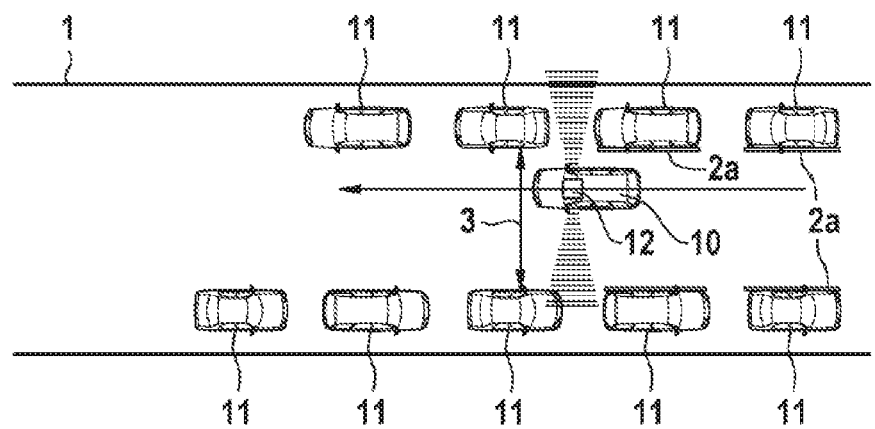
FIG. 2 shows a schematic diagram for describing an advantageous refinement of the method.

FIG. 2 shows a principle of one advantageous refinement of the method. In this case, objects, preferably in the form of vehicles 11, are detected or modeled from the measured lateral distance values by means of a processing step, as indicated by a tangential delimitation lines 2a at the vehicles 11 at which the detection vehicle 10 has already driven past. In this case as well, the usable width 3 is compared to the distances between the detected vehicles 11, and parking areas 13 may thereby be inferred.

Figure 3:
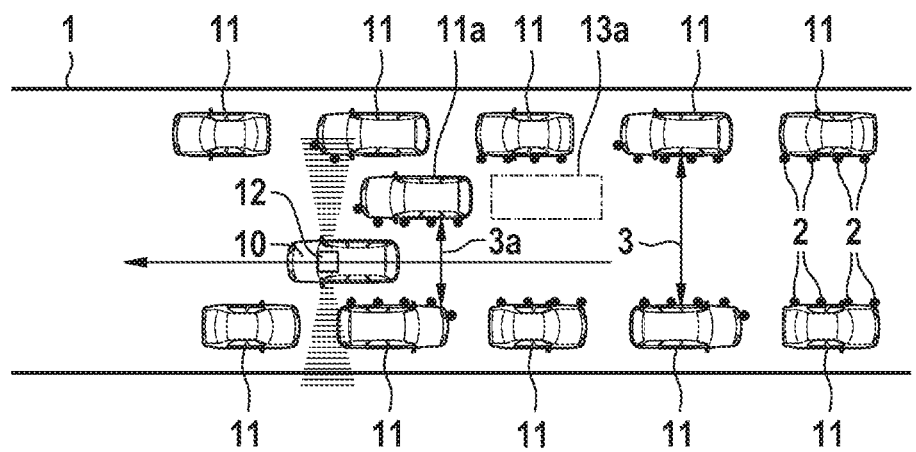
FIG. 3 shows a schematic diagram for describing a deplausibilization of an apparent parking area due to a vehicle in a second lane.

FIG. 3 indicates a principle of a deplausibilization of a "false parking area" 13a which is detected in a space behind a vehicle 11a parked in a second row and which is discarded for the purposes of the parking space map. For detecting a free parking area 13, the determination device 12 requires at least one object in front of or behind the free parking area 13, in order to generate a signal transition. This may be achieved in that a currently measured usable width 3a between the vehicle 11a parked in the second row and the opposite vehicle 11, and the previously known usable width 3, is significantly different. Here as well, a comparison of the currently measured usable width 3a to the previously known usable width 3 thus takes place, whereby a false parking space is discarded, tagged, or otherwise marked as invalid, and is thus not recorded in the parking space map.

Figure 4:
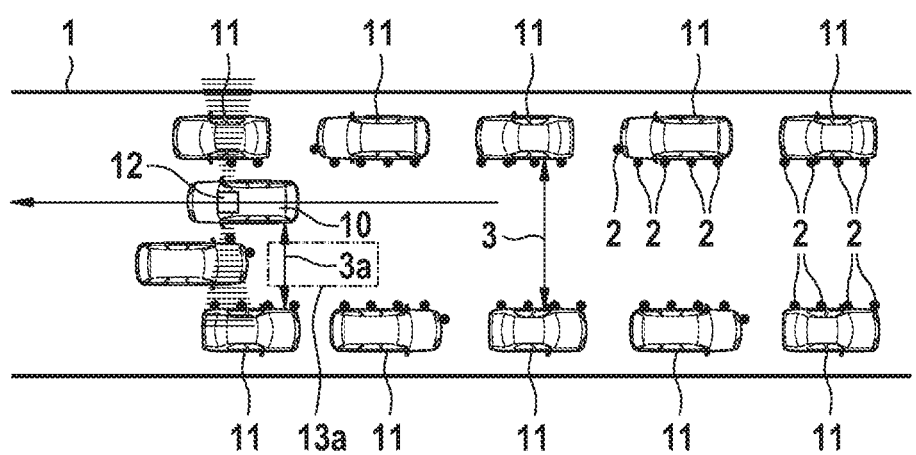
FIGS. 4 and 5 show schematic diagrams for describing a deplausibilization of an apparent parking area as a result of oncoming traffic.

As indicated in FIG. 4, this may also take place in a similar manner with a single vehicle in oncoming traffic, wherein the individual vehicle in the oncoming traffic and the detection vehicle 10 pass one another at a defined, low relative speed (for example, approximately 45 km/h). A determination of the aforementioned relative speed may take place or be adjusted in a simple manner using suitable software algorithms. In this case as well, no detection is carried out of a false parking area 13a which is thus discarded and not included in the parking space map.

Figure 5:
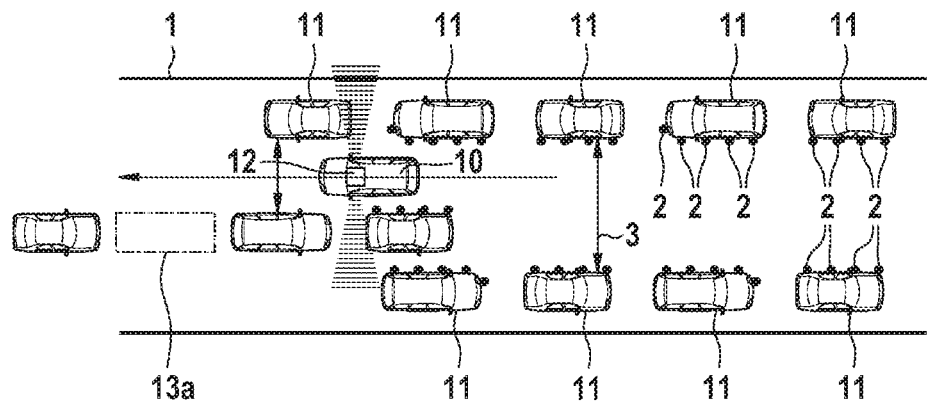

FIG. 5 corresponds essentially to FIG. 4, wherein in this case, a scenario with flowing oncoming traffic is depicted, wherein a larger space occurs between two individual vehicles in the oncoming traffic, which is identified as a false parking area 13a and is discarded or deplausibilized for the purposes of the parking space map.

Figure 6:
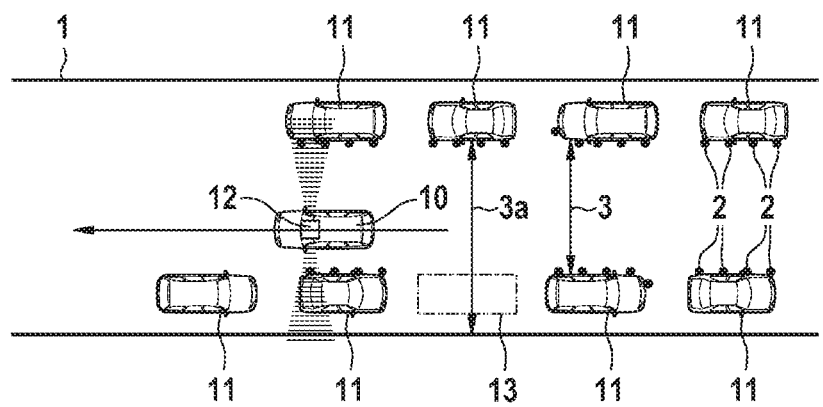
FIG. 6 shows a schematic diagram for describing an identification of a parking area.

FIG. 6 shows a "positive comparison" between the known usable width 3 and the currently measured usable width 3a, wherein the currently measured usable width 3a is greater than the known usable width 3, and therefore, a parking area 13 is identified or validated.

Figure 7:
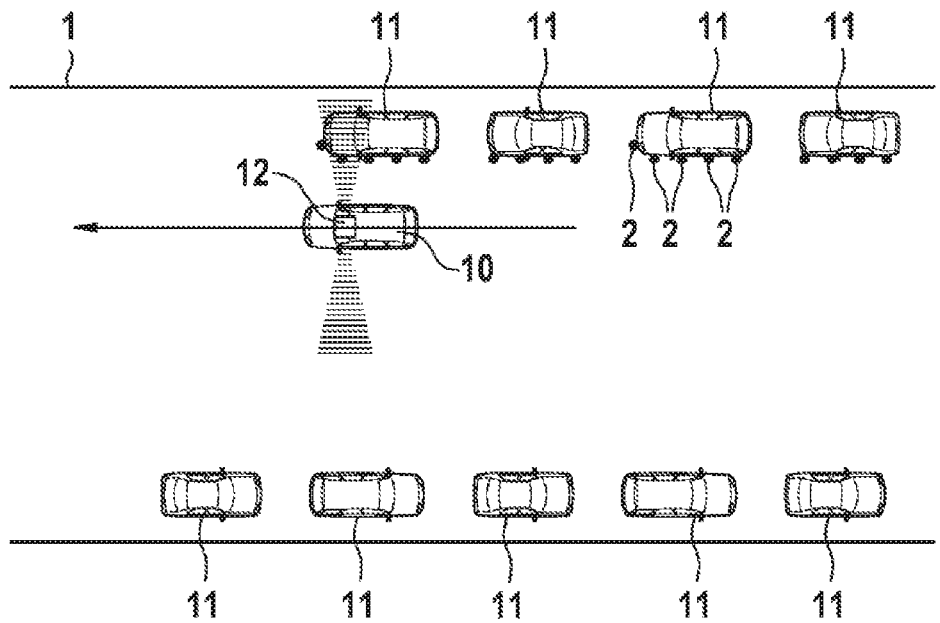
FIGS. 7 and 8 show schematic diagrams for describing a sensor range.

FIG. 7 shows a scenario in which a range of the determination device 12 on the left side of the detection vehicle 10 is not sufficient to determine the distances from the vehicles 11. Thus, only the delimitation points 2 on the right of the detection vehicle 10 are able to be determined by means of the determination device 12. In this case, in addition, a position detection device (for example, a GPS position detection device) may be used in order to determine an exact position of the detection vehicle 10 in the cm range, and in this way, to determine distances from the laterally arranged vehicles 11. For the maximum setpoint range $d_{max}$ of the determination device 12, the following is true:

$$d_{max} = 2 \times \text{maximum sensor range} + \text{width of the detection vehicle}$$

In the case that the aforementioned setpoint range $d_{max}$ is not achieved by means of the determination device 12, no comparison to the previously known usable width 3 may be carried out, and in addition, the aforementioned position detection device must be used.

Figure 8:
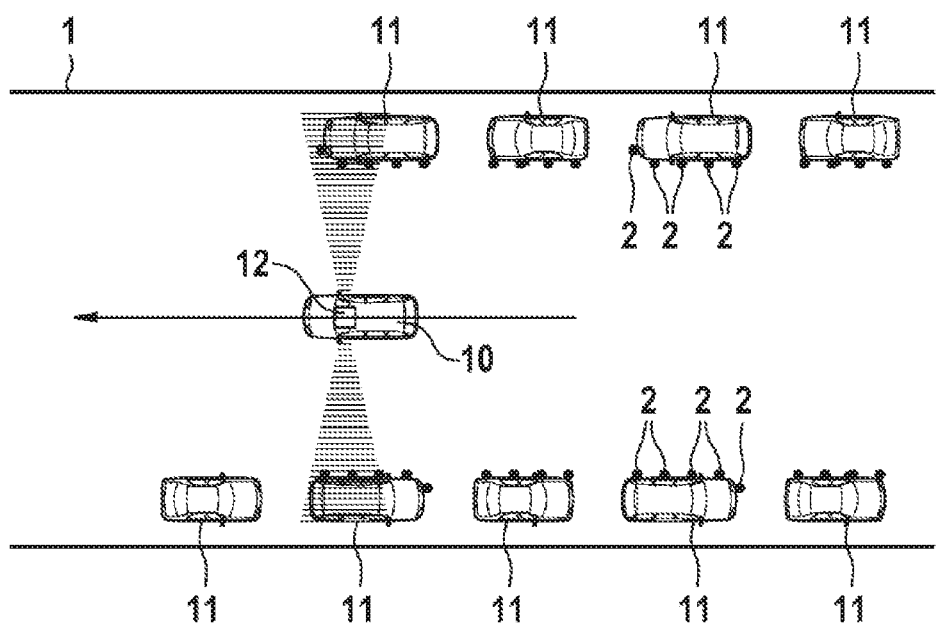

FIG. 8 indicates that a range of the determination device 12 is increased with the aid of another sensor technology, in order thereby to be able to carry out the lateral measurements. In this way, as intended, the delimitation points 2 on both sides of the detection vehicle 10 may be determined. Depending on the sensor technology used by the determination device 12, a different sensor range of the determination device 12 may be used, whereby different usable widths 3 are able to be determined, depending the technology used.

The aforementioned determinations of the lateral distances with the detection of the parking areas 13 or the deplausibilization of the false parking areas 13a may be carried out both locally on the determination device and on a decentralized server device (not depicted). For example, processing may be provided in real time or subsequent to completed journeys. A communication device for wired or wireless communication by the determination device 12 with the server device, which is required for the processing on the server device, is not depicted.

The accuracy and the reliability of the detection of the parking areas 13 increases with the number of journeys through the particular road section 1, since the averaging is carried out with an increased number of measured values.

Advantageously, the detection of the parking area 13 may carried out directly in the detection vehicle 10 itself, for example, by means of the determination device 12 or a control unit which is provided for this purpose. Alternatively or in addition, it is also conceivable that all detected data are transmitted to a server device by means of a non-depicted radio-based communication device (for example, based on GSM, EDGE, UMTS, LTE, WLAN, etc.) of the detection vehicle 10, wherein in this case, the detection of the parking area 13 is carried out by the server device, which is generally significantly more powerful.

Preferably, it may be provided to detect the parking areas 13 over a freely definable road section 1.

Preferably, it may also be provided that the described measurements are also carried out in a second travel direction of the road section 1, and are correlated with or compared to the measurement values of the journey along the road section 1 carried out first travel direction (not depicted). In this way, data quality of the parking areas 13 and accuracy of the parking space map thereby created may be still further improved.

Advantageously, the method may be implemented using various sensor technologies, for example, using ultrasonic or radar sensors, whereby economic aspects may be taken into account.

Preferably, the method is implemented as software, whereby simple adaptability or updatability of the method is supported.

Figure 9:
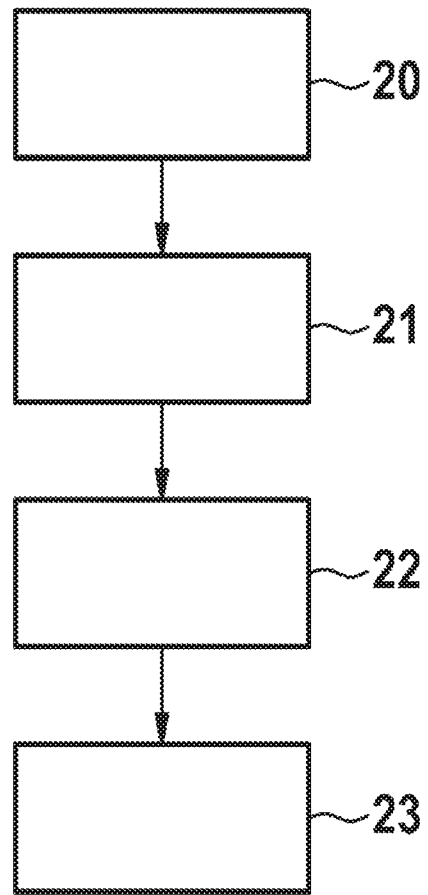
FIG. 9 shows a flow chart of one embodiment of the method according to the disclosure.

FIG. 9 shows a schematic flow chart of one embodiment of the method according to the disclosure:

In a step 20, a usable width 3 of the road section 1 is provided, wherein the usable width 3 represents a drivable width of the road section 1 between parked vehicles 11.

In a step 21, traveling the road section 1 is carried out by means of a detection vehicle 10, and determination of lateral distances from objects is carried out by means of a determination device 12 arranged in the detection vehicle 10.

In a step 22, a comparison of the determined lateral distances to the usable width 3 is carried out.

In a step 23, the parking area 13 is detected by means of the comparison.

In summary, via the disclosure, a method and a device for detecting a parking area of a road section are provided. As a result, a type of data mining is carried out, which performs a continuous comparison of a determined usable width to a previously known usable width while traveling. As a result, it is possible to create high-quality parking space maps in an efficient manner. Advantageously, occupied may be used for identifying the parking areas and do not have to be unoccupied in order to be detected.

Although the disclosure has been described above with reference to specific application examples, those skilled in the art may also implement specific embodiments which were not disclosed above or which were disclosed above only partially, without deviating from the essence of the disclosure.

The invention claimed is:

1. A method for detecting a parking area on at least one road section, comprising:
    identifying a usable width of the road section, the usable width representing a drivable width of the road section between parked vehicles;
    traveling the road section with a detection vehicle; and
    determining lateral distances from objects with a determination device arranged in the detection vehicle;
    comparing the determined lateral distances to the usable width; and
    detecting the parking area based on the comparison.

2. The method as claimed in claim 1, further comprising:
    determining that the determined lateral distances deviate from the usable width in a defined manner; and
    discarding an apparent parking area which is detected due to a vehicle which is parked in a second row of the road section.

3. The method as claimed in claim 1, further comprising:
determining that the determined lateral distances deviate from the usable width in a defined manner; and
discarding an apparent parking area which is detected due to a vehicle in oncoming traffic.

4. The method as claimed in claim 1, wherein a maximum usable width of the road section has the following value: 2×maximum range of the determination device+width of the detection vehicle.

5. The method as claimed in claim 4, further comprising:
determining that a range of the determination device does not cover the entire usable width;
detecting a position of the vehicle; and
comparing the detected position to the determined lateral distances.

6. The method as claimed in claim 1, further comprising:
detecting objects from the determined distance values.

7. The method as claimed in claim 1, further comprising:
carrying out the method at least partially locally in the detection vehicle and/or at least partially on a server device.

8. The method as claimed in claim 1, further comprising:
carrying out the method in real time during a journey along the road section, or subsequently to the journey along the road section, in an evaluation phase.

9. The method as claimed in claim 1, wherein a computer program product includes a program code configured to carry out the method, if the program code is stored on a computer-readable data carrier or runs on a determination device.

10. A device for detecting a parking area on at least one road section, comprising:
a detection vehicle having a determination device configured to determine lateral distances,
wherein a usable width of the road section is known to the device, and
wherein the determination device is configured to detect a parking area from a comparison of the determined lateral distances to the usable width.

11. The device as claimed in claim 10, wherein the detection vehicle includes a communication device configured to transmit data of the determination device to a server device.

12. The device as claimed in claim 10, wherein the determination device includes an ultrasonic sensor or a radar sensor.

* * * * *